W. H. WILDER.

OIL STOVE.

No. 11,337. Reissued May 16, 1893.

Attest
J. M. Spear
Wm. T. Hall

Inventor
Wm. H. Wilder
by Fraley Macaton & Co
Attys

THE NORRIS PETERS CO., PHOTO-LITHO., WASHINGTON, D. C.

UNITED STATES PATENT OFFICE.

WILLIAM H. WILDER, OF NORTHAMPTON, MASSACHUSETTS, ASSIGNOR TO THE CENTRAL OILGAS STOVE COMPANY, OF MAINE.

OIL-STOVE.

SPECIFICATION forming part of Letters Patent No. 11,337, dated May 16, 1893.

Original No. 462,936, dated November 10, 1891. Application for reissue filed February 23, 1893. Serial No. 463,493.

*To all whom it may concern:*

Be it known that I, WILLIAM H. WILDER, a citizen of the United States of America, residing at Northampton, (Florence,) in the county of Hampshire and State of Massachusetts, have invented certain new and useful Improvements in Oil-Stoves, of which the following is a specification.

The object of my invention is to improve the appearance of the ordinary oil stove, of the class shown herein, in connection with the ordinary chimneys, and, for this purpose my invention consists of an ornamental or covering mask independent of said chimney or chimneys and attached to the stove.

The invention consists further in the special means for fixing the mask in place by means of contact with the base or cone-plate and top or top plate, or with one of said parts and its chimney, the same means which holds the chimney, top grate, and cone-plate together being utilized for drawing two of said parts in contact with the mask, and serving thus for holding the mask without additional means. The mask holds the mica either by itself alone or in conjunction with the chimney, which is provided with suitable notches to receive the edges of the mica.

Figure 1:
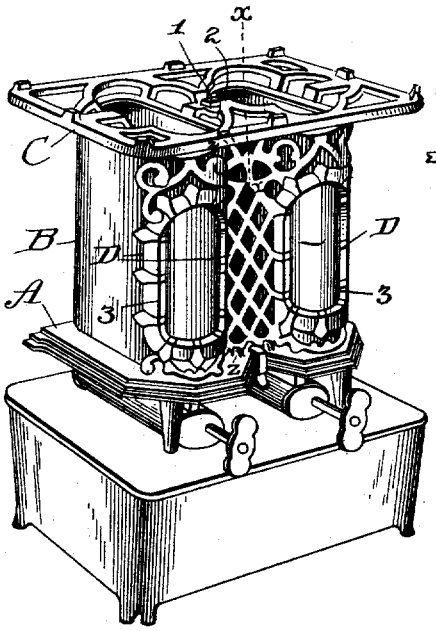
Figure 1A:
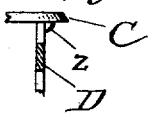
Figure 3:
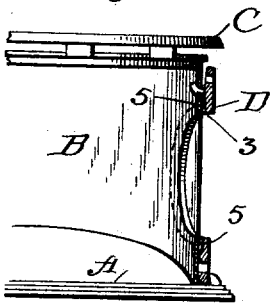
Figure 2:
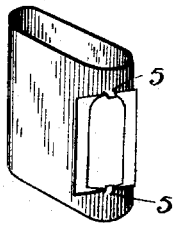

In the accompanying drawings, Figure 1, is a perspective view of a lamp-stove with the mask in place. Fig. 1ª, is a detail view of a section through a portion of the mask on line *x—x*, Fig. 1. Fig. 2, is a perspective view of a detail, and Fig. 3, is a sectional view of one modification of the manner of holding the mask in place by contact with two of the other parts.

In the construction shown in Fig. 1, two chimneys are shown placed side by side, in the ordinary manner. They are provided with light openings in front as shown at 3. Over the front of each chimney is the mask which is formed independently of the chimneys and is held rigidly on the structure in front of said chimneys. It is formed with openings arranged to register with the light openings, and has also an intermediate part which covers the space between the chimneys, thus forming a complete mask for the whole front. In the particular form shown, the base or cone plate A, the chimney B, and the top or top grate C, are shown for convenience as constructed substantially the same as those heretofore used by me; but I do not limit myself to this precise arrangement. These parts are drawn together and held by a single bolt 1, and nut 2.

The mask D, extends vertically between the cone-plate and top grate, and at its lower and upper edges it is held by contact with parts of the said cone-plate and top plate which are preferably formed with small lugs, recesses *z*, Figs. 1 and 1ª, or depressions to afford suitable bearings for the mask. When in proper vertical position the mask is held by turning the nut 2, and thus drawing the parts together and into contact.

The mask is of ornamental form, and thus improves the appearance of the stove without materially increasing the expense of manufacture. It is also utilized as a holder for the mica, and is provided with openings 3, of the size desired for the lighting-openings, and then the mask when put in place bears against its edges between the points where the notches 5, are located, and thus holds it firmly in place. Instead of this, the mica may be held entirely by the mask alone, for which purpose suitable seats or notches are formed therein when this feature is utilized.

It will be seen that the ornamental front or mask can be readily removed by simply loosening the main bolt 1, and the mica can then be removed and a new mask put on.

I do not limit myself to the particular means for holding the parts in contact, as other ways may be employed instead of the nut and bolt, as in my former patent, No. 411,209, granted September 17, 1889. Further than this my invention includes an arrangement in which the mask is held by engaging the chimney at one edge and the cone-plate at the other edge, as in Fig. 3, or the obvious reversal of this arrangement the mask engaging the top-grate at its upper edge and the chimney at its lower edge. In this form the chimney would have tongues struck out to engage the edge of the mask or holes to receive lugs projecting from the mask. The effect would be substantially the same in this arrangement as in the first described, the essential feature being that the mask be held by engaging the other parts without employing additional means for the purpose.

It will be understood that the terms "coneplate" and "top grate" as used herein are meant to designate any suitable base and top.

While I have shone the mask double and in connection with a two burner lamp, it will be clear that it may be used singly with one burner without departing from the broad feature of my invention.

I claim as my invention—

1. In combination with an oil stove having two chimneys, an independent mask upon the front of the stove, arranged to cover the space between the two chimneys, substantially as described.

2. In combination, in an oil-stove, the baseplate, top and chimney held together in a suitable way and a mask held in place by engaging two of said parts, substantially as described.

3. In combination, in an oil-stove, the baseplate, top, and chimney held together in a suitable way and a mask between the base plate and top held in place by engaging said baseplate and top, substantially as described.

4. In combination, in a lamp-stove, the baseplate, top and chimney, the mica, and a holder therefor, consisting of a mask held in place by engaging two of said parts, substantially as described.

5. In combination, in a lamp stove, the baseplate and top, notches or tongues on the chimney for the edge of the mica, and a mask held in place over the mica by engaging two of said parts, substantially as described.

WILLIAM H. WILDER.

Witnesses:
H. M. GATES,
H. D. BURNHAM.